US012190808B2

(12) United States Patent
Han

(10) Patent No.: US 12,190,808 B2
(45) Date of Patent: Jan. 7, 2025

(54) LIGHT EMITTING DISPLAY APPARATUS AND DRIVING METHOD THEREOF

(71) Applicant: LG Display Co., Ltd., Seoul (KR)

(72) Inventor: Sang Yun Han, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/227,198

(22) Filed: Jul. 27, 2023

(65) Prior Publication Data

US 2023/0368735 A1 Nov. 16, 2023

Related U.S. Application Data

(62) Division of application No. 17/855,069, filed on Jun. 30, 2022, now Pat. No. 11,756,482.

(30) Foreign Application Priority Data

Dec. 17, 2021 (KR) ........................ 10-2021-0181916

(51) Int. Cl.
*G09G 3/3233* (2016.01)

(52) U.S. Cl.
CPC ... *G09G 3/3233* (2013.01); *G09G 2300/0426* (2013.01); *G09G 2300/0842* (2013.01); *G09G 2310/0286* (2013.01); *G09G 2310/08* (2013.01); *G09G 2320/0247* (2013.01); *G09G 2320/0257* (2013.01); *G09G 2330/021* (2013.01)

(58) Field of Classification Search
CPC ......... G09G 3/3233; G09G 2300/0426; G09G 2300/0842; G09G 2310/0286; G09G 2310/08; G09G 2320/0247; G09G 2320/0257; G09G 2330/021
See application file for complete search history.

(56) References Cited

U.S. PATENT DOCUMENTS

| | | | | |
|---|---|---|---|---|
| 10,977,998 | B2 * | 4/2021 | Lee | G09G 3/3266 |
| 11,094,258 | B2 * | 8/2021 | Park | G09G 3/3275 |
| 11,170,719 | B1 | 11/2021 | Lu et al. | |
| 11,271,181 | B1 | 3/2022 | Yang et al. | |
| 11,282,461 | B2 * | 3/2022 | Li | G09G 3/3233 |
| 11,315,488 | B2 * | 4/2022 | Xie | G09G 3/3233 |
| 11,450,275 | B2 * | 9/2022 | Li | G09G 3/2003 |
| 11,468,839 | B2 * | 10/2022 | Sang | G09G 3/3233 |
| 11,488,533 | B2 * | 11/2022 | Choi | G09G 3/3233 |
| 11,508,309 | B2 * | 11/2022 | Lin | G09G 3/3266 |
| 11,508,320 | B2 * | 11/2022 | Kim | G09G 3/3266 |
| 11,538,402 | B2 | 12/2022 | Yuan et al. | |
| 11,538,412 | B1 | 12/2022 | Zhang | |

(Continued)

OTHER PUBLICATIONS

United States Office Action, U.S. Appl. No. 17/855,069, filed Jan. 6, 2023, 12 pages.

*Primary Examiner* — Jeff Piziali
(74) *Attorney, Agent, or Firm* — Fenwick & West LLP

(57) ABSTRACT

A light emitting display apparatus and a driving method thereof. The light emitting display apparatus includes a display panel configured to display an image, a timing controller including an on bias stress (OBS) voltage calculator configured to calculate an optimal OBS voltage value on the basis of a refresh rate of the display panel and a data signal which is to be supplied to the display panel, and a power supply configured to generate an OBS voltage which is to be supplied to the display panel, on the basis of the optimal OBS voltage value.

3 Claims, 14 Drawing Sheets

(56) References Cited

U.S. PATENT DOCUMENTS

| | | | | |
|---|---|---|---|---|
| 2018/0075801 | A1 | 3/2018 | Le et al. | |
| 2019/0057646 | A1* | 2/2019 | Lin | G09G 3/3233 |
| 2020/0226978 | A1* | 7/2020 | Lin | G09G 3/3233 |
| 2021/0312868 | A1 | 10/2021 | Kim et al. | |
| 2022/0084453 | A1 | 3/2022 | Pyun et al. | |
| 2022/0180812 | A1 | 6/2022 | Lin et al. | |
| 2022/0358884 | A1 | 11/2022 | Chae et al. | |
| 2022/0375400 | A1 | 11/2022 | Kim et al. | |

* cited by examiner

LIGHT EMITTING DISPLAY APPARATUS AND DRIVING METHOD THEREOF

CROSS-REFERENCE TO RELATED APPLICATIONS

This application is a divisional of U.S. patent application Ser. No. 17/855,069 filed on Jun. 30, 2022, which claims the benefit of Republic of Korea Patent Application No. 10-2021-0181916 filed on Dec. 17, 2021, each of which is hereby incorporated by reference in its entirety.

BACKGROUND

Field of Technology

The present disclosure relates to a light emitting display apparatus and a driving method thereof.

Discussion of the Related Art

As information technology advances, the market for display apparatuses which are connection mediums connecting a user to information is growing. Therefore, the use of display apparatuses such as light emitting display apparatuses, quantum dot display (QDD) apparatuses, and liquid crystal display (LCD) apparatuses is increasing.

The display apparatuses described above include a display panel which includes a plurality of subpixels, a driver which outputs a driving signal for driving the display panel, and a power supply which supplies power to the display panel or the driver.

In such display apparatuses, when the driving signal (for example, a gate signal and a data signal) is supplied to each of the subpixels provided in the display panel, a selected subpixel may transmit light or may self-emit light, and thus, an image may be displayed.

SUMMARY

The present disclosure may provide a light emitting display apparatus and a driving method thereof, which optimally maintain a gate-source voltage of a driving transistor on the basis of an on bias stress (OBS) voltage based on a driving condition such as a driving frequency, a data signal (or luminance), a refresh rate, and gamma (including DBV) to improve a flicker characteristic.

To achieve these objects and other advantages and in accordance with the purpose of the disclosure, as embodied and broadly described herein, a light emitting display apparatus includes a display panel configured to display an image, a timing controller including an on bias stress (OBS) voltage calculator configured to calculate an optimal OBS voltage value on the basis of a refresh rate of the display panel and a data signal which is to be supplied to the display panel, and a power supply configured to generate an OBS voltage which is to be supplied to the display panel, on the basis of the optimal OBS voltage value.

The OBS voltage may vary per at least one pixel, at least one line, or at least one frame on the basis of the refresh rate and the data signal.

The OBS voltage may include a first OBS voltage applied before the data voltage applied to the display panel is sampled, during a refresh period of the display panel, a second OBS voltage applied after the data voltage applied to the display panel is sampled, during the refresh period of the display panel, a third OBS voltage applied before the data voltage applied to the display panel is sampled, during an anode reset period of the display panel, and a fourth OBS voltage applied after the data voltage applied to the display panel is sampled, during the anode reset period of the display panel.

The first to fourth OBS voltages may vary based on the refresh rate and the data signal.

The first to fourth OBS voltages may vary based on the refresh rate, the data signal, and digital brightness.

The timing controller may further include a set value output unit configured to calculate an optimal value of a park voltage set which is to be supplied during an anode reset period of the display panel, an optimal value of a refresh rate set of the display panel, and an optimal value of a gamma set for converting the data signal into the data voltage, on the basis of an analysis result of the data signal input from outside.

The OBS voltage calculator may calculate an optimal OBS voltage value on the basis of the optimal value of the park voltage set, the optimal value of the refresh rate set, the optimal value of the gamma set, and a process deviation data value read from the lookup table.

In another aspect of the present disclosure, a driving method of a light emitting display apparatus includes applying a first OBS voltage before a data voltage applied to a display panel is sampled, during a refresh period of the display panel, applying a second OBS voltage after the data voltage applied to the display panel is sampled, during the refresh period of the display panel, applying a third OBS voltage before the data voltage applied to the display panel is sampled, during an anode reset period of the display panel, and applying a fourth OBS voltage after the data voltage applied to the display panel is sampled, during the anode reset period of the display panel, wherein the first to fourth OBS voltages vary based on a refresh rate of the display panel and a data signal which is to be applied to the display panel.

The first to fourth OBS voltages may vary based on the refresh rate, the data signal, and digital brightness.

The first to fourth OBS voltages may vary per at least one pixel, at least one line, or at least one frame on the basis of the refresh rate and the data signal.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Hereinafter, the present disclosure will be described more fully with reference to the accompanying drawings, in which exemplary embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

A display apparatus according to the present disclosure may be applied to televisions (TVs), video players, personal computers (PCs), home theaters, electronic devices for vehicles, and smartphones, but is not limited thereto. The display apparatus according to the present disclosure may be implemented as a light emitting display apparatus, a quantum dot display (QDD) apparatus, or a liquid crystal display (LCD) apparatus. Hereinafter, however, for convenience of description, a light emitting display apparatus self-emitting light on the basis of an inorganic light emitting diode or an organic light emitting diode will be described for example.

Moreover, an example where a gate driver described below includes a p-type thin film transistor (TFT) will be described, but is not limited thereto and the gate driver may be implemented with an n-type TFT or with an n-type TFT and a p-type TFT. A TFT may be a three-electrode element including a gate, a source, and a drain. The source may be an electrode which provides a carrier to a transistor. In the TFT, a carrier may start to flow from the source. The drain may be an electrode where the carrier flows from the TFT to the outside. That is, in the TFT, the carrier flows from the source to the drain.

In the p-type TFT, because a carrier is a hole, a source voltage may be higher than a drain voltage so that the hole flows from the source to the drain. In the p-type TFT, because the hole flows from the source to the drain, a current may flow from the source to the drain. On the other hand, in the n-type TFT, because a carrier is an electron, a source voltage may have a lower voltage than a drain voltage so that the electron flows from the source to the drain. In the n-type TFT, because the electron flows from the source to the drain, a current may flow from the drain to the source. However, a source and a drain of a TFT may switch therebetween on the basis of a voltage applied thereto. Based thereon, in the following description, one of a source and a drain will be described as a first electrode, and the other of the source and the drain will be described as a second electrode.

Figure 1:
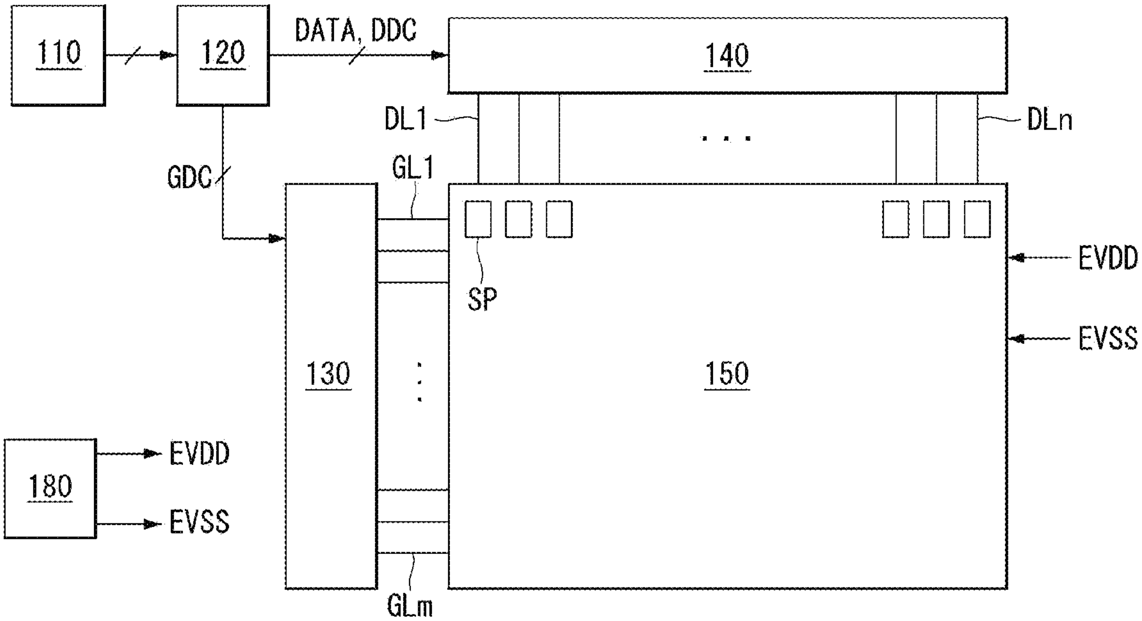
FIG. 1 is a block diagram schematically illustrating a light emitting display apparatus according to one embodiment.
Figure 2:
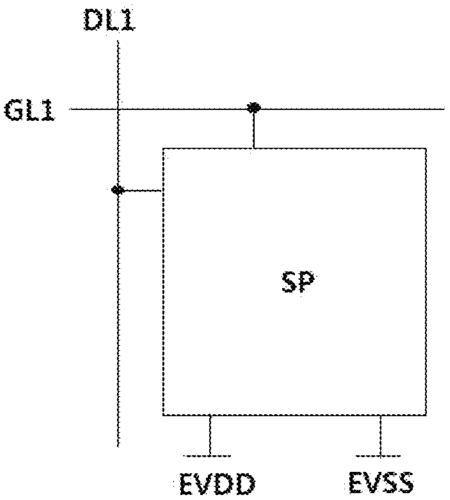
FIG. 2 is a block diagram schematically illustrating a subpixel illustrated in FIG. 1 according to one embodiment.

FIG. 1 is a block diagram schematically illustrating a light emitting display apparatus according to one embodiment, and FIG. 2 is a block diagram schematically illustrating a subpixel illustrated in FIG. 1 according to one embodiment.

As illustrated in FIGS. 1 and 2, the light emitting display apparatus may include a video supply unit 110, a timing controller 120, a gate driver 130, a data driver 140, a display panel 150, and a power supply 180.

The video supply unit 110 (or a set or a host system) may output a video data signal supplied from the outside or a video data signal and various driving signals stored in an internal memory thereof. The video supply unit 110 may supply a data signal and the various driving signals to the timing controller 120.

The timing controller 120 may output a gate timing control signal GDC for controlling an operation timing of the gate driver 130, a data timing control signal DDC for controlling an operation timing of the data driver 140, and various synchronization signals (for example, a vertical synchronization signal Vsync and a horizontal synchronization signal Hsync). The timing controller 120 may provide the data driver 140 with the data timing control signal DDC and a data signal DATA supplied from the video supply unit 110. The timing controller 120 may be implemented as an integrated circuit (IC) type and may be mounted on a printed circuit board (PCB), but is not limited thereto.

The gate driver 130 may output a gate signal (or a gate voltage) in response to the gate timing control signal GDC supplied from the timing controller 120. The gate driver 130 may supply the gate signal to a plurality of subpixels, included in the display panel 150, through a plurality of gate lines GL1 to GLm. The gate driver 130 may be implemented as an IC type or may be directly provided on the display panel 150 in a gate-in panel (GIP) type, but is not limited thereto.

In response to the data timing control signal DDC supplied from the timing controller 120, the data driver 140 may sample and latch the data signal DATA, convert a digital data signal into an analog data voltage on the basis of a gamma reference voltage, and output the analog data voltage. The data driver 140 may respectively supply data voltages to the subpixels of the display panel 150 through a plurality of data lines DL1 to DLn. The data driver 140 may be implemented as an IC type or may be mounted on the display panel 150 or a PCB, but is not limited thereto.

The power supply 180 may generate a first power having a high level and a second power having a low level on the basis of an external input voltage supplied from the outside and may respectively output the first power and the second power through a first power line EVDD and a second power line EVSS. The power supply unit 180 may generate a voltage (for example, a gate voltage including a gate high voltage and a gate low voltage that is less than the gate high voltage) needed for driving of the gate driver 130 or a voltage (for example, a drain voltage and a half drain voltage) needed for driving of the data driver 140, in addition to the first power and the second power.

The display panel 150 may display an image on the basis of a driving signal including the gate signal and a data voltage, the first power, and the second power. The subpixels of the display panel 150 may each self-emit light. The display panel 150 may be manufactured based on a substrate, having stiffness or flexibility, such as glass, silicon, or polyimide. Also, the subpixels emitting light may include pixels including red, green, and blue, or may include pixels including red, green, blue, and white.

For example, one subpixel SP may be connected to a first data line DL1, a first gate line GL1, the first power line EVDD, and the second power line EVSS and may include a pixel circuit which includes a switching transistor, a driving transistor, a storage capacitor, and an organic light emitting diode. The subpixel SP applied to the light emitting display apparatus may self-emit light, and thus, may be complicated in circuit configuration. Also, the subpixel SP may further include various circuits such as a compensation circuit which compensates for a degradation in the organic light emitting diode emitting light and a degradation in the driving transistor supplying a driving current to the organic light emitting diode. Accordingly, it may be assumed that the subpixel SP is simply illustrated in a block form.

Hereinabove, each of the timing controller 120, the gate driver 130, and the data driver 140 has been described as an individual element. However, based on an implementation type of the light emitting display apparatus, one or more of the timing controller 120, the gate driver 130, and the data driver 140 may be integrated into one (e.g., a single) integrated circuit (IC).

Figure 3:
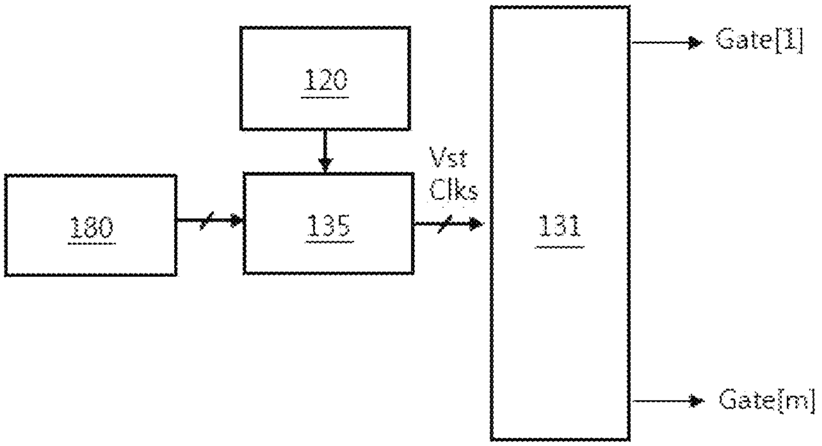
FIGS. 3 and 4 are diagrams for describing a configuration of a gate driver of a gate-in panel (GIP) type according to one embodiment.
Figure 4:
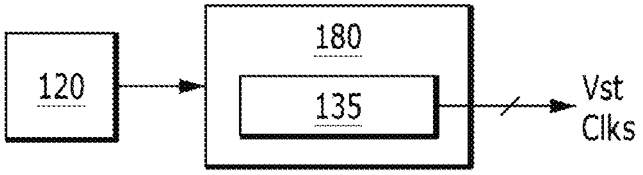
Figure 5A:
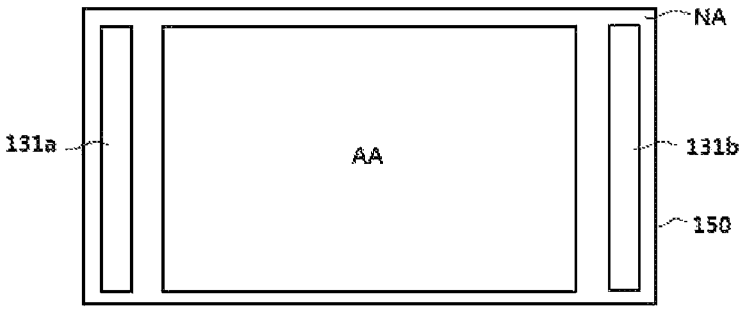
FIGS. 5A and 5B are diagrams illustrating examples of an arrangement of a GIP-type gate driver according to one embodiment.
Figure 5B:
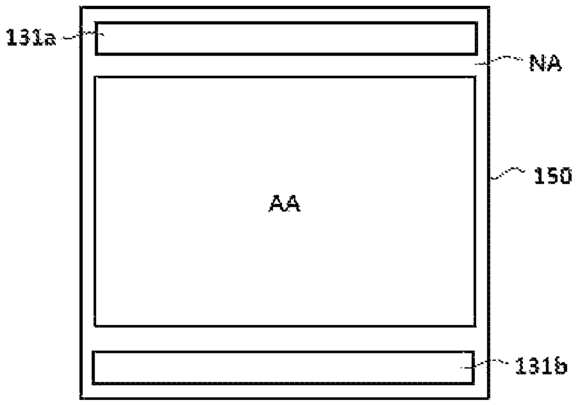

FIGS. 3 and 4 are diagrams for describing a configuration of a GIP-type gate driver according to one embodiment, and FIGS. 5A and 5B are diagrams illustrating example arrangements of the GIP-type gate driver according to one embodiment.

As illustrated in FIG. 3, a GIP type gate driver 130 may include a shift register 131 and a level shifter 135. The level shifter 135 may generate driving clock signals Clks and a start signal Vst on the basis of signals and voltages output from a timing controller 120 and a power supply 180. The clock signals Clks may be generated in a J-phase form (where J is an integer of 2 or more) where phases such as two phases, four phases, or eight phases differ.

The shift register 131 may operate based on the signals Clks and Vst output from the level shifter 135 and may output gate signals Gate[1] to Gate[m] for turning on/off transistors provided in a display panel. The shift register 131 may be implemented as a thin film type on the display panel on the basis of the GIP type.

As illustrated in FIGS. 3 and 4, unlike the shift register 131, the level shifter 135 may be independently implemented as an IC type or may be included in the power supply 180. However, this may be merely an embodiment, and the present disclosure is not limited thereto.

As illustrated in FIGS. 5A and 5B, a plurality of shift registers **131*a* and 131*b* for outputting gate signals in a GIP-type gate driver may be disposed in a non-display area NA of a display panel 150. The shift registers 131*a* and 131*b*, as in FIG. 5A, may be disposed in left and right non-display areas NA of the display panel 150. Also, as in FIG. 5B, the shift registers 131*a* and 131*b* may be disposed in upper and lower non-display areas NA of the display panel 150. In FIGS. 5A and 5B, an example where the shift registers 131*a* and 131*b*** are disposed in the non-display area NA is illustrated and described, but the present disclosure is not limited thereto.

Figure 6:
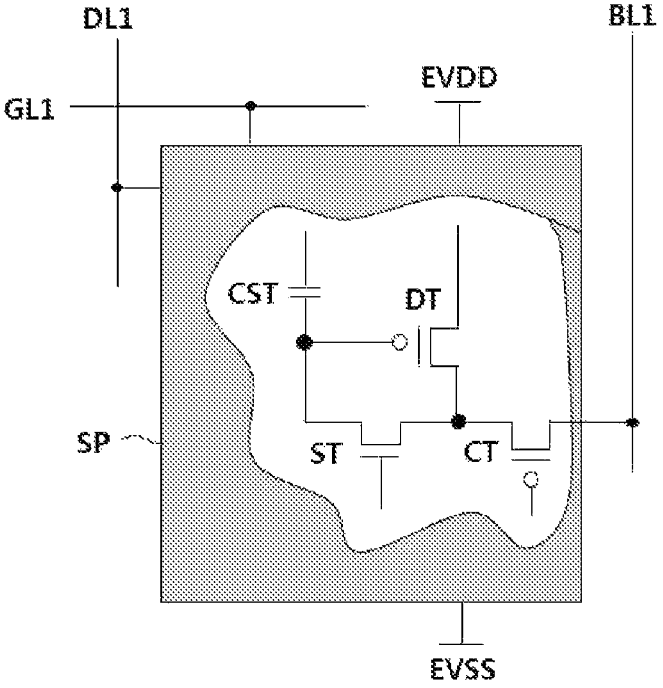
FIG. 6 is a block diagram schematically illustrating a subpixel according to an embodiment of the present disclosure.
Figure 7:
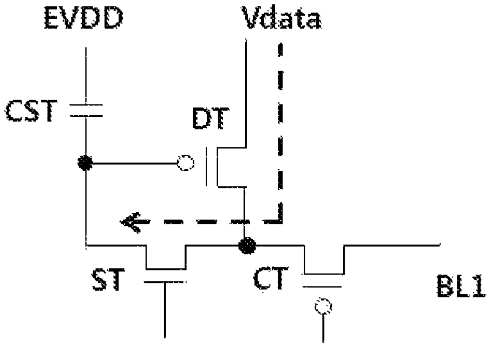
FIGS. 7 and 8 are diagrams for describing a driving method of the subpixel illustrated in FIG. 6 according to one embodiment.
Figure 8:
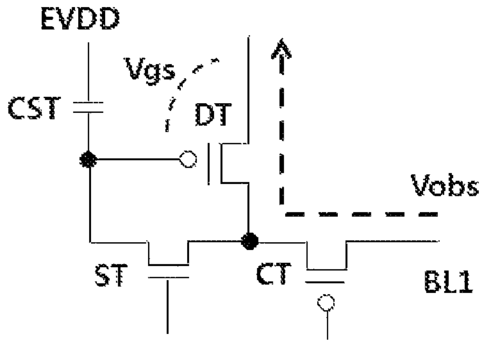

FIG. 6 is a block diagram schematically illustrating a subpixel according to an embodiment of the present disclosure, and FIGS. 7 and 8 are diagrams for describing a driving method of the subpixel illustrated in FIG. 6 according to one embodiment.

As illustrated in FIG. 6, a subpixel SP according to an embodiment may include a capacitor CST, a driving transistor DT, a switching transistor ST, and a compensation transistor CT. The switching transistor ST may be an oxide transistor including an oxide semiconductor layer. Here, the driving transistor DT and the compensation transistor CT may each be implemented as a p type transistor, and the switching transistor ST may be implemented as an n type transistor.

The capacitor CST may store a data voltage Vdata and may apply the data voltage Vdata to a gate electrode of the driving transistor DT. The driving transistor DT may generate a driving current needed for driving of an organic light emitting diode on the basis of the data voltage Vdata applied from the capacitor CST.

The switching transistor ST may electrically connect the gate electrode of the driving transistor DT to a second electrode of the driving transistor DT to form a diode-connection state, for sampling a threshold voltage of the driving transistor DT. The compensation transistor CT may apply an on bias stress (OBS) voltage, transferred through a first bias voltage line BL1, to the driving transistor DT so as to maintain luminance in refresh driving of a subpixel (or a display panel).

According to an embodiment, the subpixel SP including a p-type transistor or an n type transistor may further include another circuit such as an organic light emitting diode, in addition to an illustrated configuration. Also, as in an embodiment, in the subpixel SP including a p-type transistor or an n-type transistor, a circuit may be implemented variously in configuration, and thus, only elements may be illustrated as in FIG. 6.

As illustrated in FIG. 7, according to an embodiment, the switching transistor ST may be turned on for compensating for the threshold voltage of the driving transistor DT, the gate electrode and the second electrode of the driving transistor DT may be electrically connected to form a diode-connection state, and the data voltage Vdata may be applied. Subsequently, the organic light emitting diode may emit light with the driving current generated from the driving transistor DT driven based on the data voltage stored in the capacitor CST.

As illustrated in FIG. 8, in an embodiment, the OBS voltage Vobs may be applied through the compensation transistor CT turned on for maintaining luminance in refresh driving. The OBS voltage Vobs may be selected at a voltage level Vgs for forming a specific condition (on bias stress: a condition for minimizing recognition of an afterimage caused by hysteresis) in the gate electrode and a first electrode of the driving transistor DT.

Figure 9:
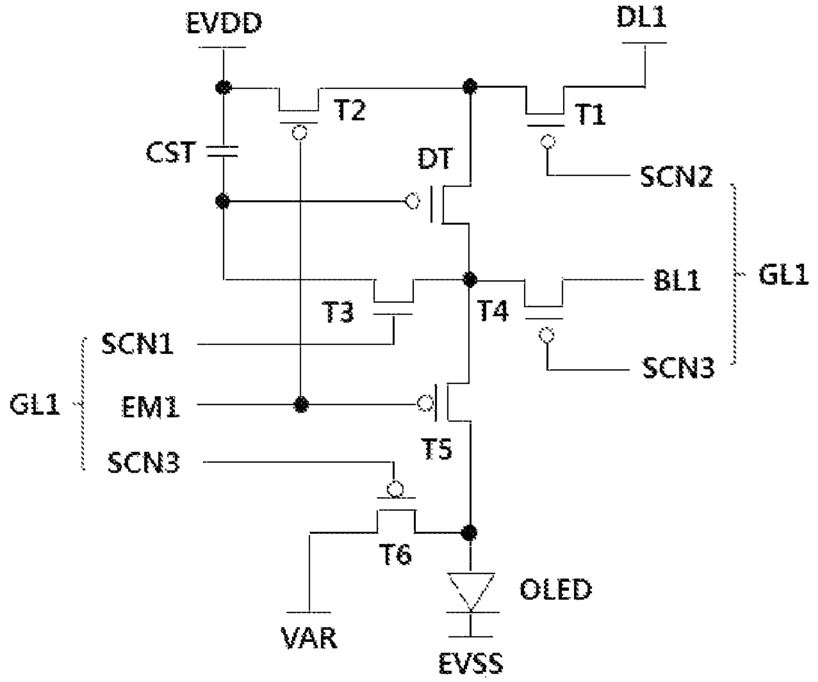
FIG. 9 is an exemplary diagram illustrating a configuration of a subpixel according to one embodiment.
Figure 10:
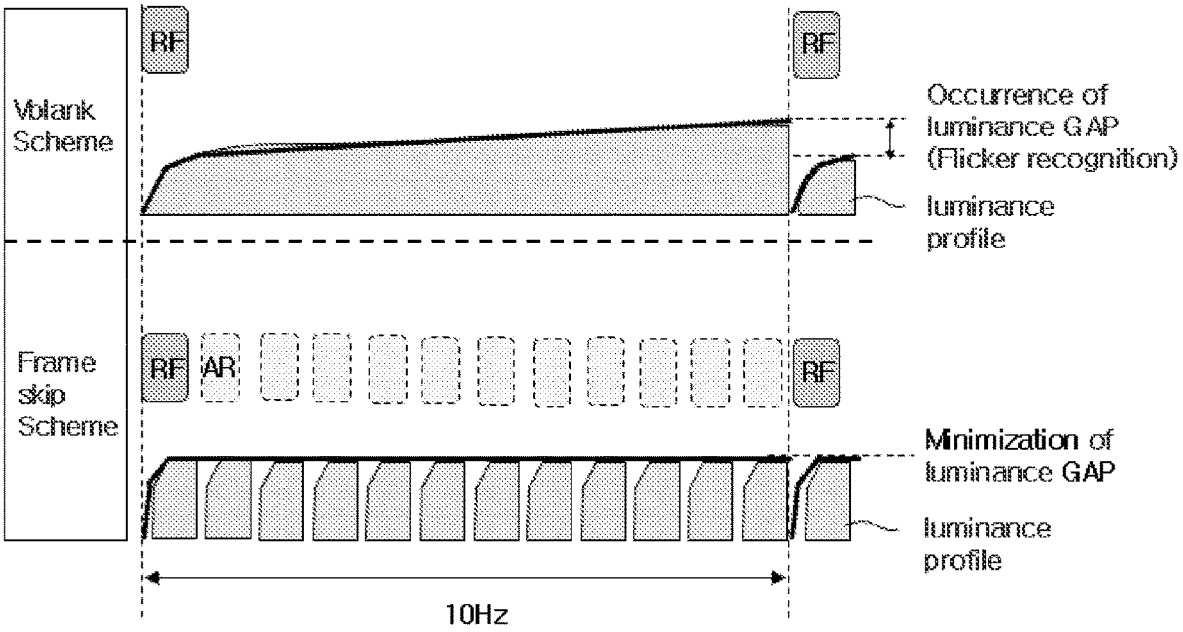
FIG. 10 is a diagram for describing a refresh method based on the subpixel illustrated in FIG. 6 according to one embodiment.

FIG. 9 is an exemplary diagram illustrating a configuration of a subpixel applicable to the present disclosure, and FIG. 10 is a diagram for describing a refresh method based on the subpixel illustrated in FIG. 6 according to one embodiment.

As illustrated in FIG. 9, a subpixel applicable to an embodiment may include a first transistor T1, a second transistor T2, a third transistor T3, a fourth transistor T4, a fifth transistor T5, a sixth transistor T6, a capacitor CST, a driving transistor DT, and an organic light emitting diode OLED. In the subpixel illustrated in FIG. 9, the third transistor T3 may correspond to the switching transistor ST of FIG. 6, and the fourth transistor T4 may correspond to the compensation transistor CT of FIG. 6. The third transistor T3 may be an oxide transistor including an oxide semiconductor layer.

The subpixel applicable to an embodiment may be connected to a first gate line GL1 including a first scan line SCN1, a second scan line SCN2, a third scan line SCN3, and a first emission control line EM1. Here, the third scan line SCN3 may use a scan line included in a front-end or rear-end subpixel instead of a currently illustrated subpixel.

The third transistor T3 may be turned on in response to a first scan signal transferred through the first scan line SCN1, the first transistor T1 may be turned on in response to a second scan signal transferred through the second scan line SCN2, and the fourth and sixth transistors T4 and T6 may be turned on in response to a third scan signal transferred through the third scan line SCN3. Also, the second and fifth transistors T2 and T5 may be turned on in response to an emission control signal transferred through the first emission control line EM1.

As seen with reference to FIG. 9, in the subpixel applicable to an embodiment, the fourth transistor T4 and the sixth transistor T6 may be simultaneously turned on. When the fourth transistor T4 is turned on, the driving transistor DT may be supplied with the OBS voltage Vobs transferred through the first bias voltage line BL1. The driving transistor DT may form a specific condition (on bias stress) in the gate electrode and the first electrode Vgs of the driving transistor DT on the basis of the OBS voltage Vobs transferred through the first bias voltage line BL1 during a refresh period.

When the sixth transistor T6 is turned on, the organic light emitting diode OLED may be supplied with a park voltage transferred through a park voltage line VAR. The organic light emitting diode OLED may have a condition for maintaining specific luminance on the basis of the park voltage transferred through the park voltage line VAR during an anode reset period.

As illustrated in FIG. 10, in an embodiment, low-speed driving (for example, 10 Hz) may be performed. Refresh driving may be performed for maintaining certain luminance in low-speed driving. In a case where refresh driving is performed based on the subpixel illustrated in FIG. 6, a blank Vblank scheme or a frame skip scheme may be used.

The blank Vblank scheme may be a scheme where a refresh period RF is inserted by N frame units (where N is an integer of 2 or more), and the frame skip scheme may be a scheme where the refresh period RF is inserted by N frame units and an anode reset period AR is added therebetween. For example, the anode reset period AR may be added for each frame in low-speed driving, but is not limited thereto.

Comparing a luminance profile of the blank Vblank scheme with a luminance profile of the frame skip scheme, in the blank Vblank scheme, a luminance difference Gap may occur because a period where the refresh period RF is inserted is long. When a luminance difference is large, this may be recognized as flicker. On the other hand, in the frame skip scheme, the luminance difference Gap may be minimized (e.g., reduced) as the anode reset period AR is added between refresh periods RF. Accordingly, in an embodiment, the frame skip scheme for minimizing the luminance difference Gap has been described above for example, but the present disclosure is not limited thereto.

Figure 11:
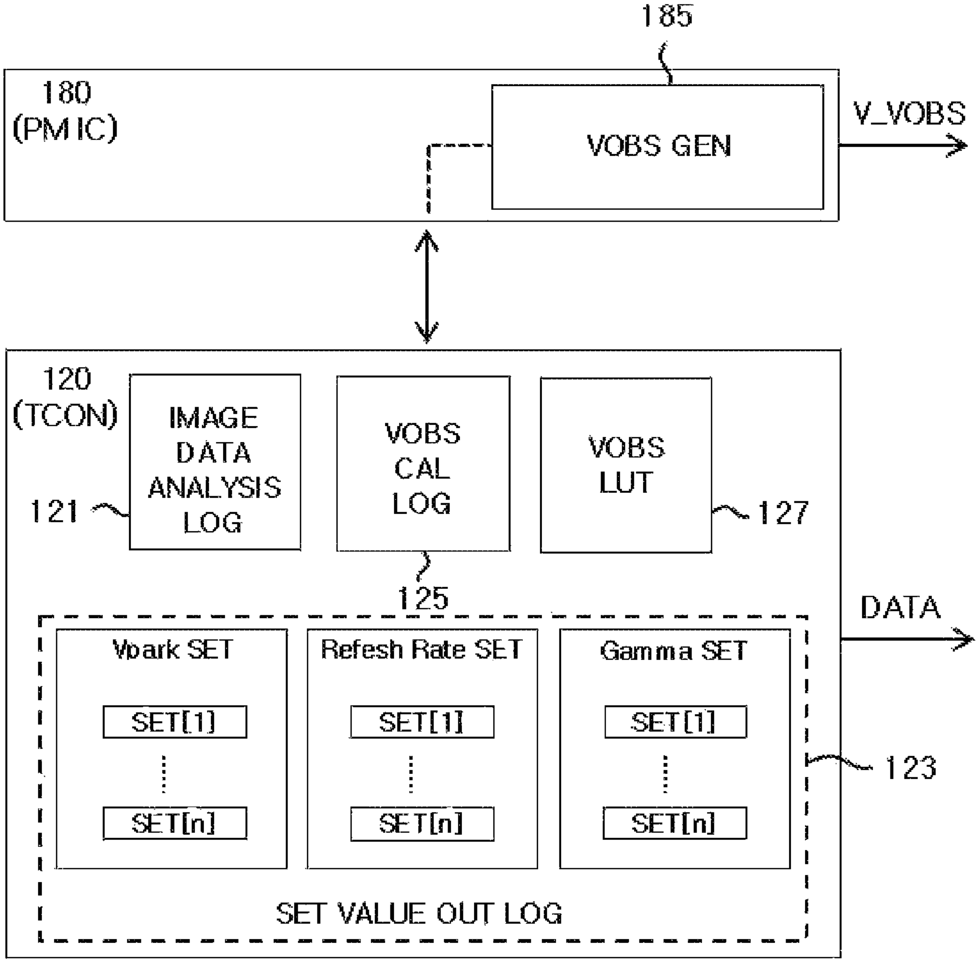
FIGS. 11 and 12 are diagrams schematically illustrating a portion of a light emitting display apparatus according to an embodiment of the present disclosure.
Figure 12:
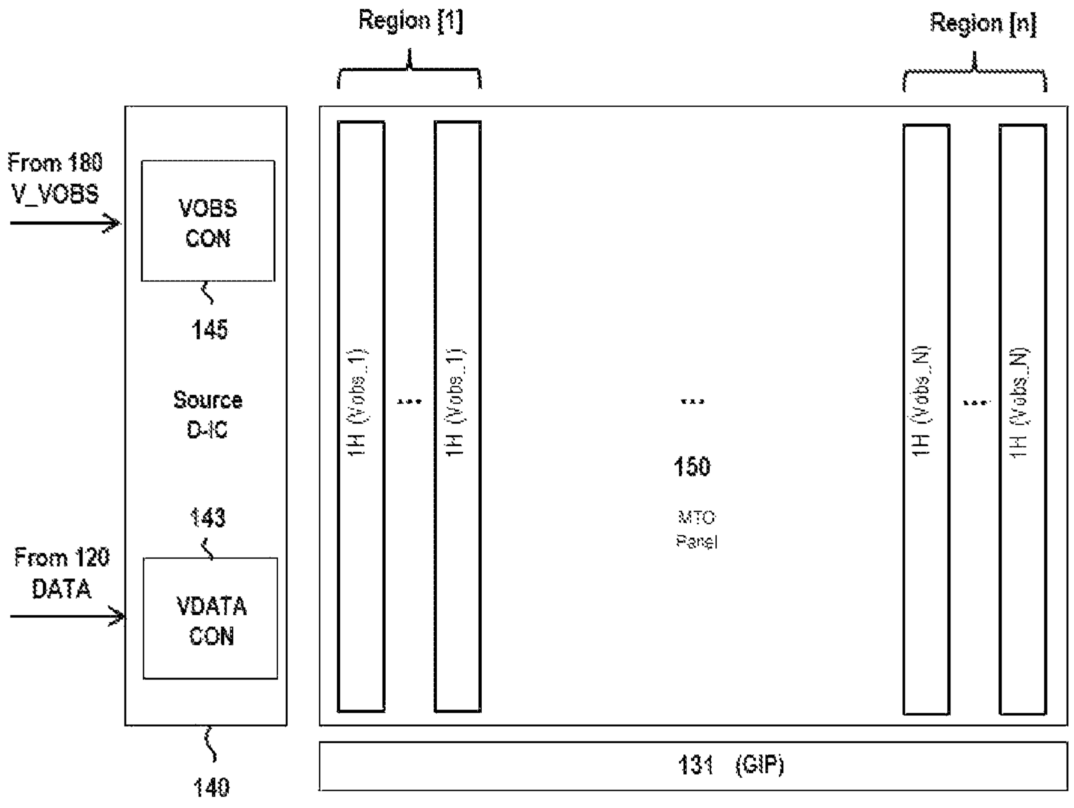
Figure 13:
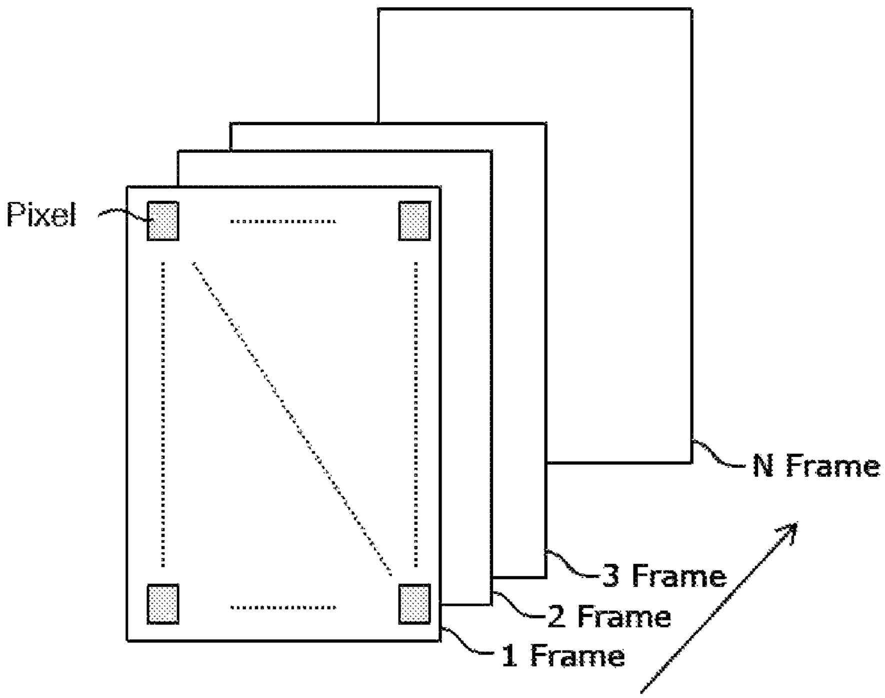
FIGS. 13 to 15 are diagrams for describing an on bias stress (OBS) voltage applying method according to an embodiment of the present disclosure.
Figure 14:
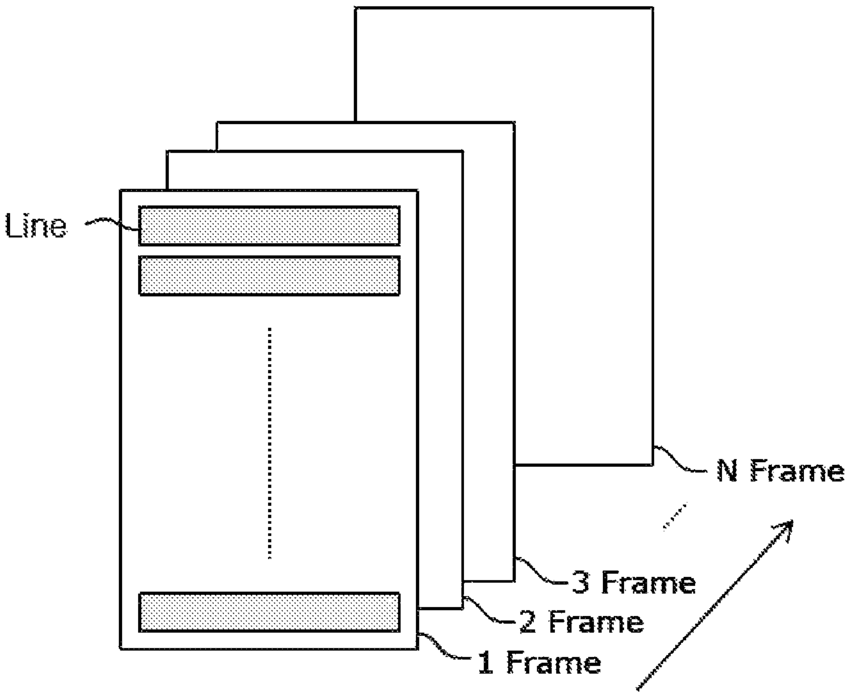
Figure 15:
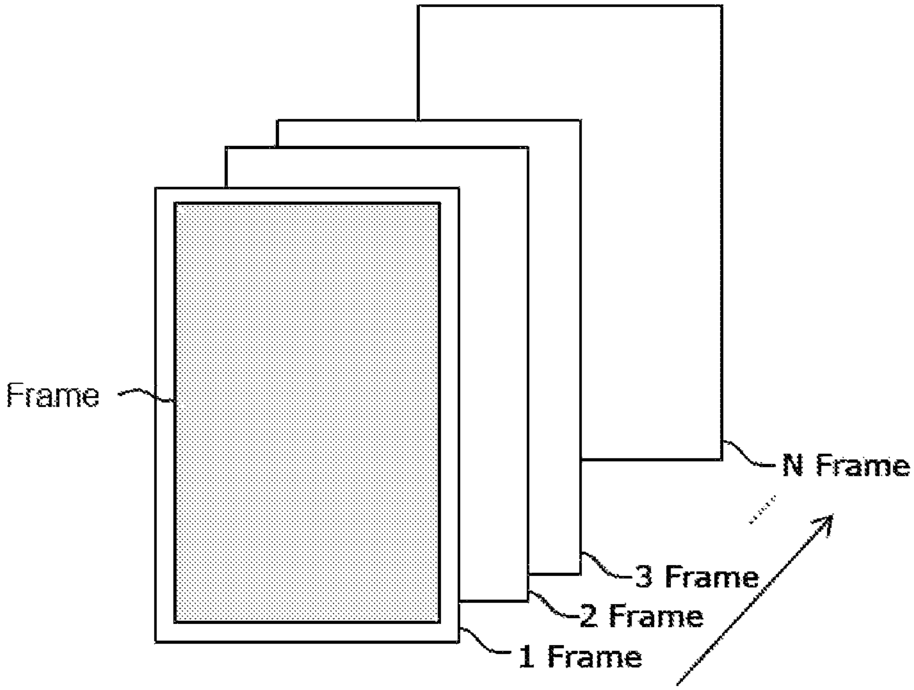

FIGS. 11 and 12 are diagrams schematically illustrating a portion of a light emitting display apparatus according to an embodiment of the present disclosure, and FIGS. 13 to 15 are diagrams for describing an on bias stress (OBS) voltage applying method according to an embodiment of the present disclosure.

As illustrated in FIGS. 11 and 12, the light emitting display apparatus according to an embodiment of the present disclosure may include a timing controller 120, a power supply 180, a data driver 140, and a display panel 150.

As in FIG. 11, the timing controller 120 (TCON) may include an image data analyzer 121 (IMAGE DATA ANALYSIS LOG), a set value output unit 123 (SET VALUE OUT LOG), an OBS voltage calculator 125 (VOBS CAL LOG), and a lookup table 127 (VOBS LUT).

The image data analyzer 121 may analyze a data signal input from the outside and may transfer an analysis result to the set value output unit 123. The image data analyzer 121 may analyze a characteristic of the data signal by pixel units, by line units, and by frame units.

The set value output unit 123 may calculate and output an optimal value of set values on the basis of the analysis result of the data signal transferred from the image data analyzer 121. The set value output unit 123 may calculate and output an optimal value of set values SET[1] to SET[n] of a park voltage set (Vpark SET), an optimal value of set values SET[1] to SET[n] of a refresh rate set (Refresh Rate SET), and an optimal value of set values SET[1] to SET[n] of a gamma set (Gamma SET) on the basis of the analysis result of the data signal.

The set values SET[1] to SET[n] of a park voltage set (Vpark SET) may include voltage values applied to an anode of an organic light emitting diode during the anode reset period. The set values SET[1] to SET[n] of a refresh rate set (Refresh Rate SET) may include refresh rate values based on a driving frequency of a display panel. The set values SET[1] to SET[n] of a gamma set (Gamma SET) may include gamma values which is to be used in converting the data signal into a data voltage. Also, the set values SET[1] to SET[n] of a gamma set (Gamma SET) may include a digital brightness value DBV where gamma is capable of varying based on a value input as a digital type.

For example, the set value output unit 123 may select an optimal refresh rate value corresponding to a driving frequency for currently driving the display panel and may calculate and output an optimal park voltage value and an optimal gamma value which is the most suitable for the data signal input thereto. As described above, the set value output unit 123 may match an optimal value for each set on the basis of the driving frequency and the input data signal, and thus, may be referred to as an OBS matching unit.

The OBS voltage calculator 125 may calculate an optimal OBS voltage value on the basis of an optimal value of the park voltage set, an optimal value of the refresh rate set, and an optimal value of the gamma set output from the set value output unit 123 and a data value read from the lookup table 127. That is, when an optimal value for each set is matched and output by the set value output unit 123, the OBS voltage calculator 125 may consider a deviation characteristic (a process deviation characteristic) for each process, each dimension, and each display panel in an optimal value for each set so as to calculate an optimal OBS voltage value. For example, the OBS voltage calculator 125 can be selected from a processor that executes code stored in memory to calculate the optimal OBS voltage value.

The lookup table 127 may include a process deviation data value obtained by data-digitizing and modeling a deviation characteristic for each process, each dimension, and each display panel in manufacturing a display panel. The process deviation data value stored in the lookup table 127 may be provided to the OBS voltage calculator 125 in calculating an OBS voltage.

The timing controller 120 may calculate an optimal OBS voltage value based on a driving condition such as a data signal (or luminance), a refresh rate (or a driving frequency), and gamma (including DBV) on the basis of the above-described configuration and may supply the calculated optimal OBS voltage value to the power supply 180. Also, the timing controller 120 may read an optimal OBS voltage applying method based on the driving condition, and based thereon, may generate an OBS selection signal for applying an OBS voltage.

The power supply 180 may include an OBS voltage generator 185 (VOBS GEN). The OBS voltage generator 185 may generate an optimal OBS voltage V_VOBS on the basis of the optimal OBS voltage value supplied from the timing controller 120.

The power supply 180 may generate the optimal OBS voltage V_VOBS on the basis of the above-described configuration and may vary and output the optimal OBS voltage V_VOBS on the basis of a variation of a driving condition such as a data signal (or luminance), a refresh rate (or a driving frequency), and gamma (including DBV) in connection with the timing controller 120.

As in FIG. 12, the data driver 140 may include a data voltage controller 143 (VDATA CON) and an OBS voltage controller 145 (VOBS VCON).

The data voltage controller 143 may convert a data signal DATA, supplied from the timing controller 120, into a data voltage and may supply the data voltage to the display panel 150. The data voltage controller 143 may sample and latch the data signal DATA supplied from the timing controller 120 and may convert a digital data signal into an analog data voltage on the basis of a gamma reference voltage to output the analog data voltage.

The OBS voltage controller 145 may control the optimal OBS voltage V_VOBS supplied from the power supply 180 to supply the controlled OBS voltage to the display panel 150 and may control an OBS voltage output method. The OBS voltage controller 145 may output the controlled OBS voltage by pixel units, line units, or frame units. The OBS voltage controller 145 may be directly supplied with an OBS selection signal as a separate signal from the timing controller 120, or may be supplied with the OBS selection signal in a communication packet format along with the data signal DATA.

The data driver 140 may classify a plurality of lines as one region on the basis of the above-described configuration and may apply OBS voltages Vobs_1 to Vobs_N to first to Nth regions Region [1] to Region [n] respectively. One or more of the OBS voltages Vobs_1 to Vobs_N applied to the first to Nth regions Region [1] to Region [n] may differ. That is, the data driver 140 may apply different OBS voltages to one or more lines, but is not limited thereto and an application method may be changed.

As illustrated in FIG. 13, the data driver 140 may apply different OBS voltages to pixels. Based on such a method, the data driver 140 may apply OBS voltages having different levels to pixels in one frame. Such a method may be identically applied to second to Nth frames (where N is an integer of 2 or more), but may be differently changed based on a driving condition.

As illustrated in FIG. 14, the data driver 140 may apply OBS voltages having different levels to lines (or a different OBS voltage for each 1H). Based on such a method, the data driver 140 may apply OBS voltages having different levels to lines in one frame. Such a method may be identically applied to second to Nth frames (where N is an integer of 2 or more), but may be differently changed based on a driving condition.

As illustrated in FIG. 15, the data driver 140 may apply OBS voltages having different levels to frames. Based on such a method, the data driver 140 may apply OBS voltages having the same level to all lines, but this may be changed per one frame. Such a method may be identically applied to second to Nth frames (where N is an integer of 2 or more), but may be differently changed based on a driving condition.

Figure 16:
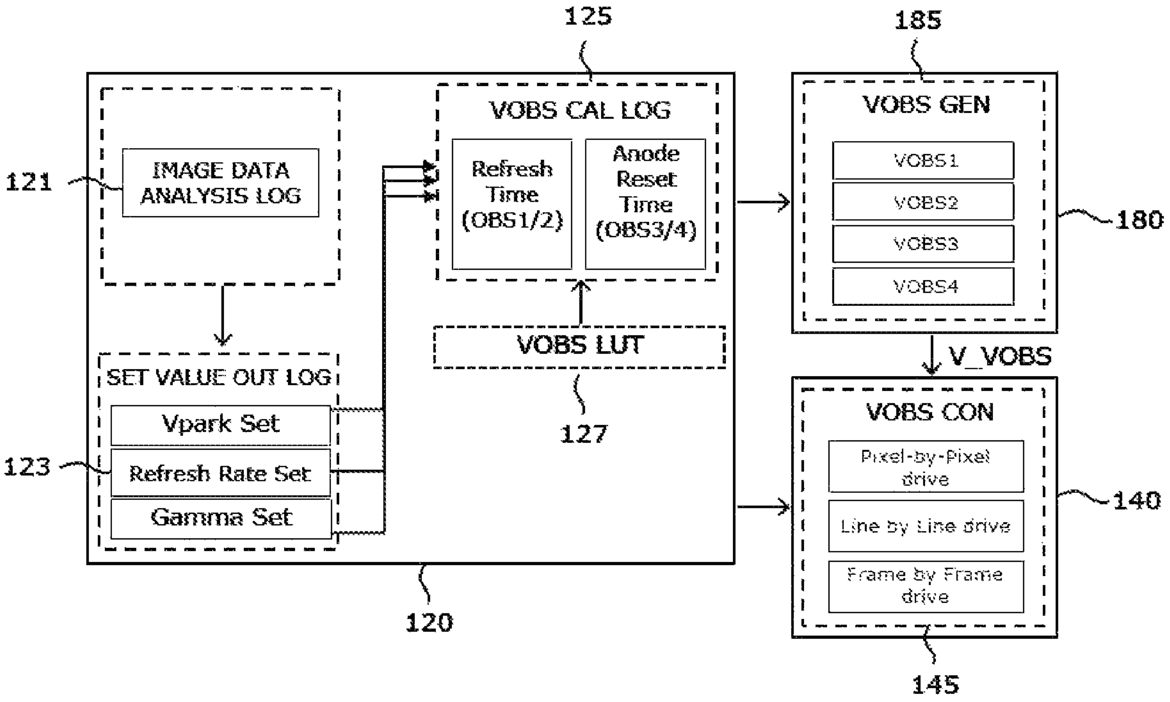
FIG. 16 is a diagram illustrating in more detail a portion of a light emitting display apparatus according to an embodiment of the present disclosure.
Figure 17:
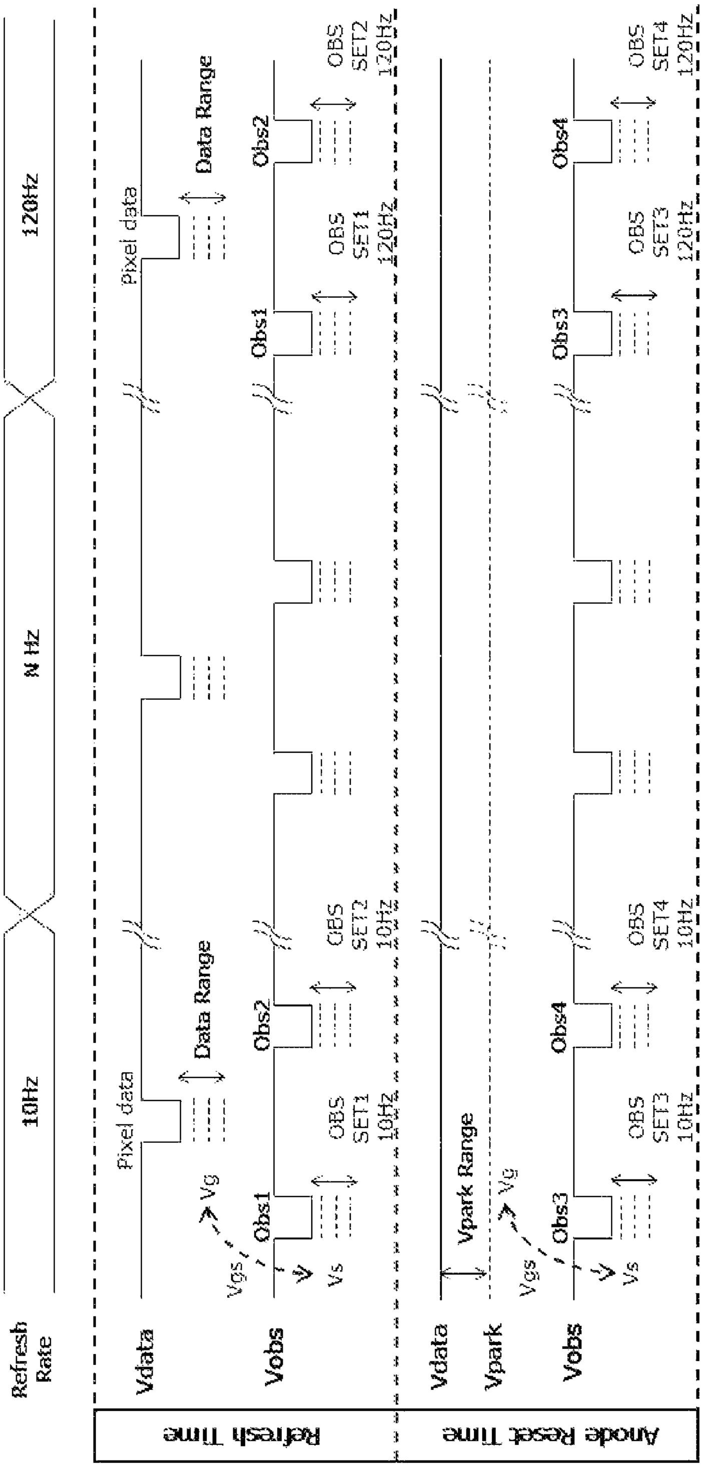
FIG. 17 is a waveform diagram for showing a refresh period and an anode reset period according to an embodiment of the present disclosure.
Figure 18:
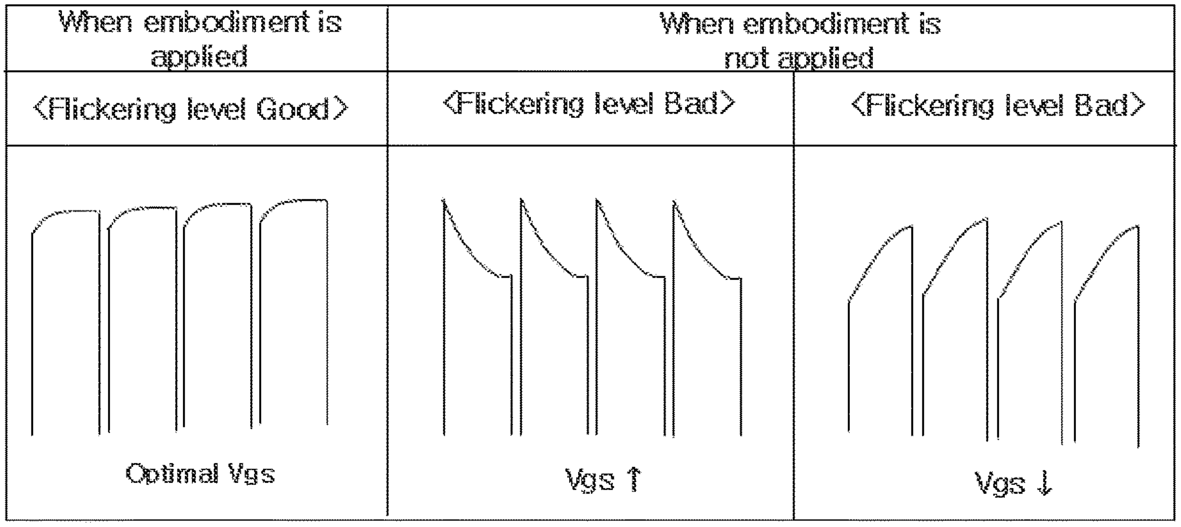
FIG. 18 is a waveform diagram for describing advantages according to an embodiment of the present disclosure.

FIG. 16 is a diagram illustrating in more detail a portion of a light emitting display apparatus according to an embodiment of the present disclosure, FIG. 17 is a waveform diagram for showing a refresh period and an anode reset period according to an embodiment of the present disclosure, and FIG. 18 is a waveform diagram for describing advantages according to an embodiment of the present disclosure. Hereinafter, elements which are not described in detail above will be described in more detail.

As illustrated in FIGS. 16 and 17, the set value output unit 123 may calculate and output an optimal value of set values on the basis of an analysis result of a data signal transferred from the image data analyzer 121. To this end, the set value output unit 123 may include a park voltage set (Vpark SET), a refresh rate set (Refresh Rate SET), and a gamma set (Gamma SET). For example, the set value output unit 123 can be selected from a processor that executes code stored in memory to calculate the optimal value of the set values.

The park voltage set (Vpark SET) may be used for setting a park voltage output from the data driver during an anode reset period on the basis of the analysis result of the data signal. The park voltage may be set to an optimal park voltage value calculated based on the analysis result of the data signal during the anode reset period. The park voltage may be calculated as an optimal park voltage value for each black voltage period and each white voltage period.

The refresh rate set (Refresh Rate SET) may be used for setting a refresh rate based on a difference with the anode reset period in a display panel on the basis of the analysis result of the data signal. The refresh rate may vary based on an image characteristic of an input data signal like a refresh rate (for example, 10 Hz) in low-speed driving (or a still image), a refresh rate (for example, 60 Hz) in normal driving (or a moving image), and a refresh rate (for example, 120 Hz) in high-speed driving (or a game image).

The gamma set (Gamma SET) may be used for setting a gamma voltage to implement during a refresh period of the display panel by using an image characteristic of the data signal on the basis of the analysis result of the data signal. Each gamma data may be used in a threshold voltage sampling period of a driving transistor included in each subpixel.

The OBS voltage calculator 125 may calculate an optimal OBS voltage value on the basis of an optimal value of the park voltage set, an optimal value of the refresh rate set, and an optimal value of the gamma set output from the set value output unit 123 and a data value read from the lookup table 127.

The OBS voltage calculator 125 may divide and calculate first and second OBS voltage values (OBS1/2) used during a refresh period (Refresh Time) and third and fourth OBS voltage values (OBS3/4) used during an anode reset period (Anode Reset Time).

The first OBS voltage value OBS1 may be applied before a data voltage applied to the display panel is sampled during the refresh period (Refresh Time). Also, the second OBS voltage value OBS2 may be applied after the data voltage applied to the display panel is sampled during the refresh period (Refresh Time). As described above, the use purpose and application time of a first OBS voltage Obs1 may differ from those of a second OBS voltage Obs2. Accordingly, a level of the first OBS voltage Obs1 generated from the first OBS voltage value OB S1 may differ from that of the second OBS voltage Obs2 generated from the second OBS voltage value OBS2, and such a condition may be changed for each frame on the basis of a driving condition as described above.

The third OBS voltage value OBS3 may be applied before a data voltage applied to the display panel is sampled during the anode reset period (Anode Reset Time). Also, the fourth OBS voltage value OBS4 may be applied after the data voltage applied to the display panel is sampled during the anode reset period (Anode Reset Time). As described above, the use purpose and application time of a third OBS voltage Obs3 may differ from those of a fourth OBS voltage Obs4. Accordingly, a level of the third OBS voltage Obs3 generated from the third OBS voltage value OBS3 may differ from that of the fourth OBS voltage Obs4 generated from the fourth OBS voltage value OBS4, and such a condition may be changed for each frame on the basis of a driving condition as described above.

The OBS voltage generator 185 included in the power supply 180 may generate and output the first to fourth OBS voltages Obs1 to Obs4 on the basis of the first to fourth OBS voltage values OBS1 to OBS4. The optimal OBS voltage V_VOBS generated from the power supply 180 may be transferred to the data driver 140.

The data driver 140 may convert a data signal, supplied from the timing controller 120, into a data voltage Vdata and may supply the data voltage Vdata to the display panel 150. The data driver 140 may supply the display panel 150 with the data voltage Vdata corresponding to pixel data (Pixel data) for expressing an image during the refresh period (Refresh Time). The data voltage Vdata corresponding to the pixel data (Pixel data) may be used for expressing an image and may have a range (Data Range) capable of varying based on a characteristic of an image. The data driver 140 may output the data voltage Vdata which is higher than a park voltage Vpark, during the anode reset period (Anode Reset Time). The park voltage Vpark may have a range (Vpark Range) capable of varying up to a level of the data voltage Vdata.

The data driver 140 may output an OBS voltage Vobs by pixel units (pixel-by-pixel drive), by line units (line-by-line drive), or by frame units (frame-by-frame drive) by using the OBS voltage controller 145. At this time, the data driver 140 may autonomously select an output method on the basis of a variation of a driving condition, or may select an output method on the basis of an OBS selection signal supplied from the timing controller 120. An output method of the OBS voltage Vobs may be changed based on a driving condition shown in the following Table 1.

TABLE 1

| | OBS Output Method | | |
|---|---|---|---|
| | DBV | Refresh Rate | OBS |
| Pixel Unit (Pixel-by-Pixel drive)<br>Line Unit (Line by Line drive)<br>Frame Unit (Frame by Frame drive) | Per DBV | Per Refresh Rate | Per Sequence |

Based on the driving condition, when an output method of the OBS voltage Vobs is variously changed by pixel units (pixel-by-pixel drive), by line units (line-by-line drive), or by frame units (frame-by-frame drive), an inter-frame luminance deviation compensation rate may increase.

Furthermore, FIG. 17 may merely show the data voltage Vdata and the OBS voltage Vobs applied during the refresh period (Refresh Time) and the anode reset period (Anode Reset Time) in low-speed driving (10 Hz), arbitrary driving (N Hz: low speed, middle speed, and high speed), and high-speed driving (120 Hz) of a light emitting display apparatus, but the present disclosure is not limited thereto.

As described above, in an embodiment of the present disclosure, an optimal OBS voltage based on a driving condition such as a data signal (or luminance), a refresh rate (or a driving frequency), and gamma (including DBV) may be output. Also, the optimal OBS voltage (different OBS voltage levels) may be differently applied for each period. As a result, as in FIG. 18, in a case where an embodiment is applied, as a gate-source voltage Vgs of a driving transistor is maintained at an optimal level, a flicker level may be maintained in a good state. However, in a case where an embodiment is not applied, as the gate-source voltage Vgs of the driving transistor increases (when Vgs is excessively generated) or decreases (when Vgs is insufficiently generated), it may be difficult to maintain a flicker level in a good state.

According to the present disclosure, the gate-source voltage Vgs of the driving transistor may be optimally maintained based on an OBS voltage Vobs based on a driving condition such as a driving frequency, a data signal (or luminance), a refresh rate, and gamma (including DBV) to improve a flicker characteristic. Also, according to the present disclosure, an inter-frame luminance deviation compensation rate may increase by performing multi-conversion on an OBS voltage Vobs by pixel units (pixel-by-pixel drive), by line units (line-by-line drive), or by frame units (frame-by-frame drive) on the basis of the driving condition.

The effects according to the present disclosure are not limited to the above examples, and other various effects may be included in the specification.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. A driving method of a light emitting display apparatus, the driving method comprising:

receiving a data voltage;

calculating a park voltage and a refresh rate that both correspond to the received data voltage;

calculating a first on bias stress (OBS) voltage and a second OBS voltage to apply during a refresh period of a display panel based on the calculated park voltage and the calculated refresh rate that corresponds to the received data voltage;

calculating a third OBS voltage and a fourth OBS voltage to apply during an anode reset period of the display panel that is after the refresh period, the third OBS voltage and the fourth OBS voltage calculated based on the calculated park voltage and the calculated refresh rate that corresponds to the received data voltage;

applying the first OBS voltage to the display panel before the data voltage applied to the display panel is sampled, during the refresh period of the display panel;

applying the second OBS voltage after the data voltage applied to the display panel is sampled, during the refresh period of the display panel;

applying the third OBS voltage before the data voltage applied to the display panel is sampled, during the anode reset period of the display panel that occurs after the second OBS voltage is applied to the display panel; and applying the fourth OBS voltage after the data voltage applied to the display panel is sampled, during the anode reset period of the display panel.

2. The driving method of claim 1, wherein the first OBS voltage to the fourth OBS voltage vary based on the refresh rate, the data voltage, and digital brightness.

3. The driving method of claim 1, wherein the first OBS voltage to the fourth OBS voltage vary per at least one pixel, at least one line, or at least one frame based on the refresh rate and the data voltage.

* * * * *